US011364911B2

(12) United States Patent
Tanaka et al.

(10) Patent No.: US 11,364,911 B2
(45) Date of Patent: Jun. 21, 2022

(54) VEHICLE CONTROL APPARATUS

(71) Applicant: MITSUBISHI JIDOSHA KOGYO KABUSHIKI KAISHA, Tokyo (JP)

(72) Inventors: Sumio Tanaka, Tokyo (JP); Yusuke Sasaki, Tokyo (JP); Ryo Shimizu, Tokyo (JP); Tatsuya Tawaki, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 225 days.

(21) Appl. No.: 16/425,708

(22) Filed: May 29, 2019

(65) Prior Publication Data
US 2019/0367031 A1 Dec. 5, 2019

(30) Foreign Application Priority Data

May 30, 2018 (JP) .............................. JP2018-103822
Mar. 19, 2019 (JP) .............................. JP2019-051609

(51) Int. Cl.
*B60W 30/18* (2012.01)
*B60W 10/08* (2006.01)
(Continued)

(52) U.S. Cl.
CPC ...... *B60W 30/18045* (2013.01); *B60W 10/08* (2013.01); *B60W 30/025* (2013.01);
(Continued)

(58) Field of Classification Search
CPC ........... B60W 30/18045; B60W 10/08; B60W 30/025; B60W 40/107; B60W 50/0098; B60W 2510/081; B60W 2510/083
See application file for complete search history.

(56) References Cited

U.S. PATENT DOCUMENTS 6,205,379 B1 * 3/2001 Morisawa ............. B60W 10/26
701/22
7,566,288 B2 * 7/2009 Tabata ................ B60W 10/105
477/4

(Continued)

FOREIGN PATENT DOCUMENTS

JP 2008-149966 A 7/2008
JP 2014-231789 A 12/2014
(Continued)

OTHER PUBLICATIONS

Japanese Office Action issued in Japanese Application No. JP 2019-051609 dated Apr. 26, 2022, with English translation.

*Primary Examiner* — Geepy Pe
*Assistant Examiner* — Daniel Tyler Reich
(74) *Attorney, Agent, or Firm* — Birch, Stewart, Kolasch & Birch, LLP

(57) ABSTRACT

A vehicle control apparatus includes a detection section, a control section. The detection section is configured to detect vehicle information including a vehicle speed of a vehicle driven by an electric motor and drive torque of the electric motor. The control section is configured to moderate a rate of increase in the drive torque at the time of acceleration with respect to a rate of increase set in advance on the basis of a detection result of the detection section on condition that the vehicle speed of the vehicle is less than or equal to a predetermined speed and the drive torque is greater than or equal to a predetermined threshold.

6 Claims, 8 Drawing Sheets

(51) Int. Cl.
  *B60W 30/02* (2012.01)
  *B60W 40/107* (2012.01)
  *B60W 50/00* (2006.01)

(52) U.S. Cl.
  CPC ...... *B60W 40/107* (2013.01); *B60W 50/0098* (2013.01); *B60W 2510/081* (2013.01); *B60W 2510/083* (2013.01)

(56) References Cited

U.S. PATENT DOCUMENTS

2016/0137100 A1    5/2016  Nishida et al.
2016/0185336 A1*   6/2016  Ueno ...................... B60L 58/12
                                                        701/22
2018/0170386 A1*   6/2018  Jung ........................ B60L 7/18

FOREIGN PATENT DOCUMENTS

JP    2016-10299 A    1/2016
JP    2016-96657 A    5/2016

\* cited by examiner

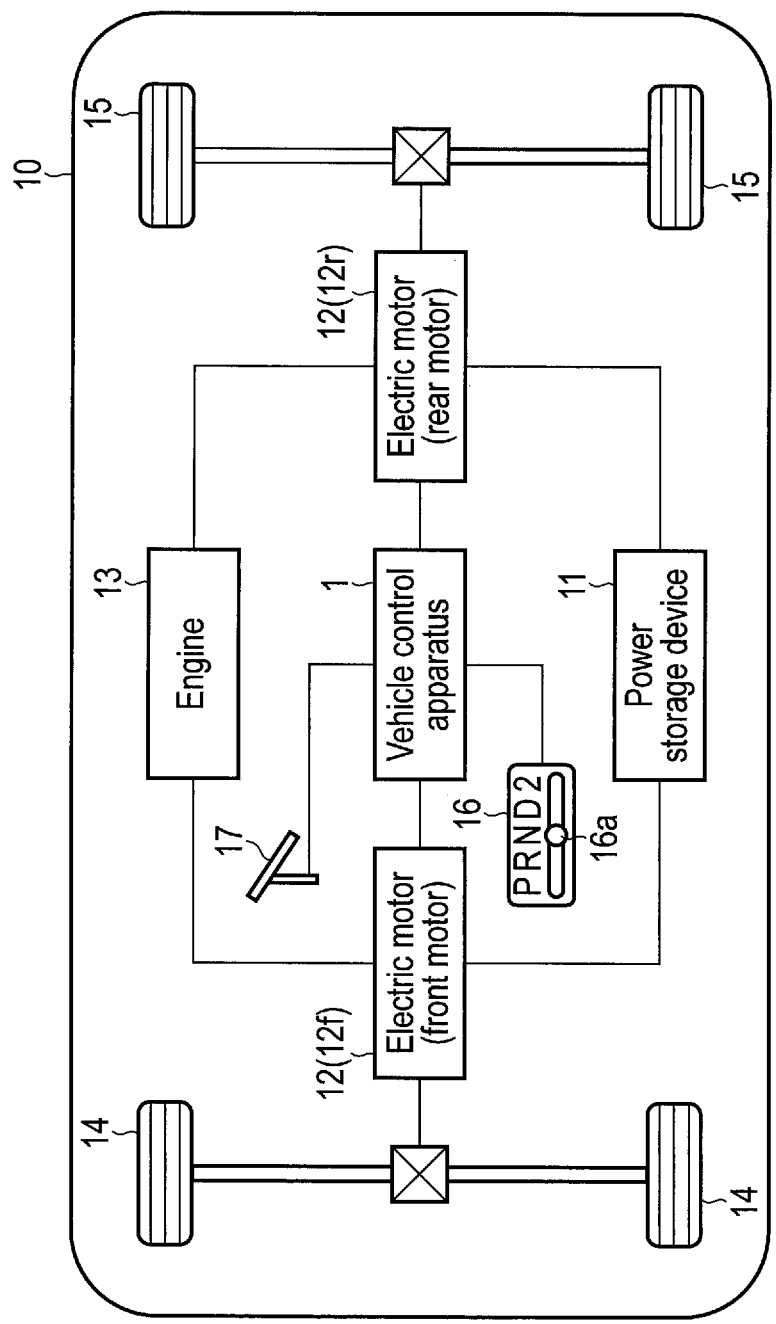
F I G. 1

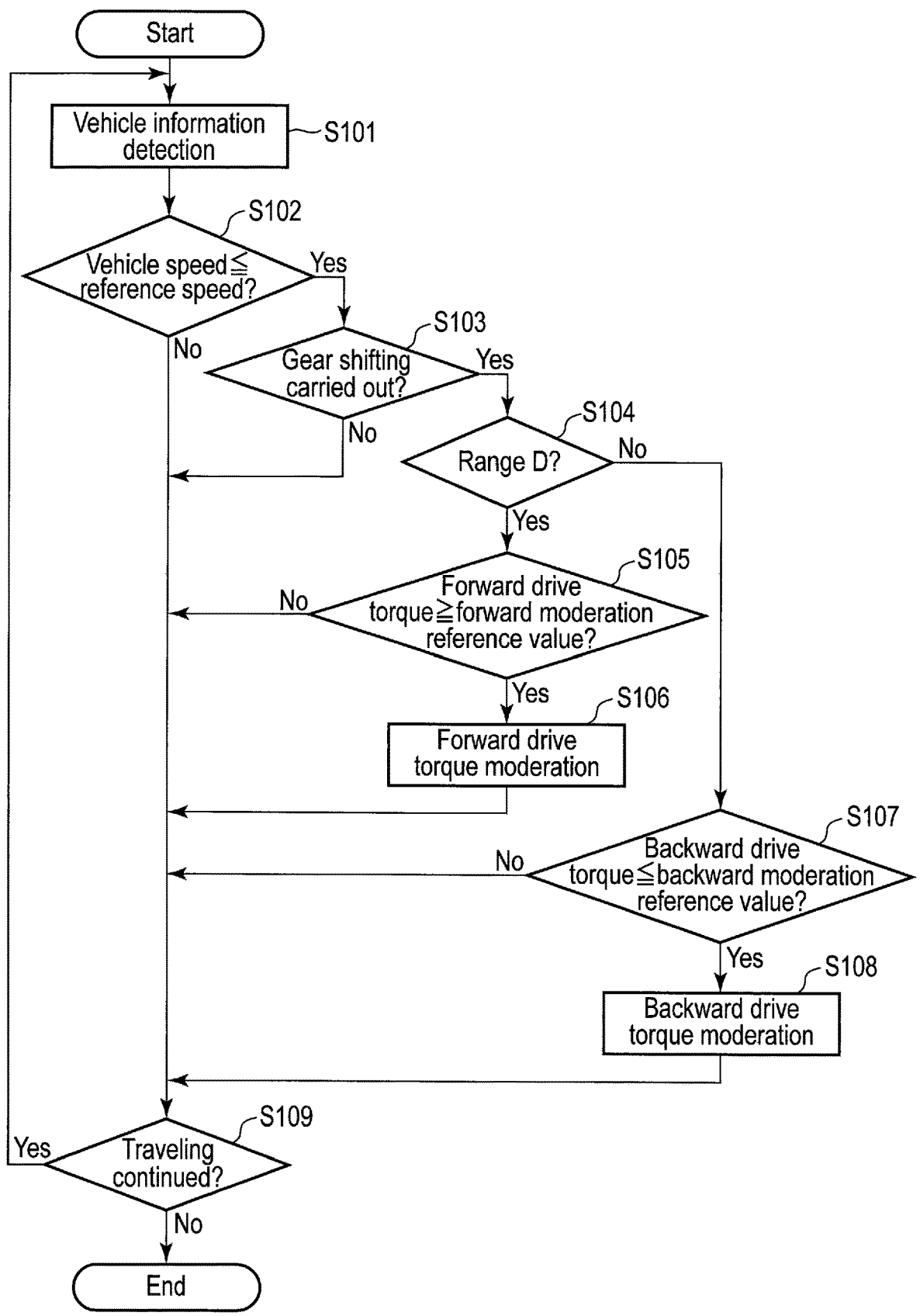
F I G. 3

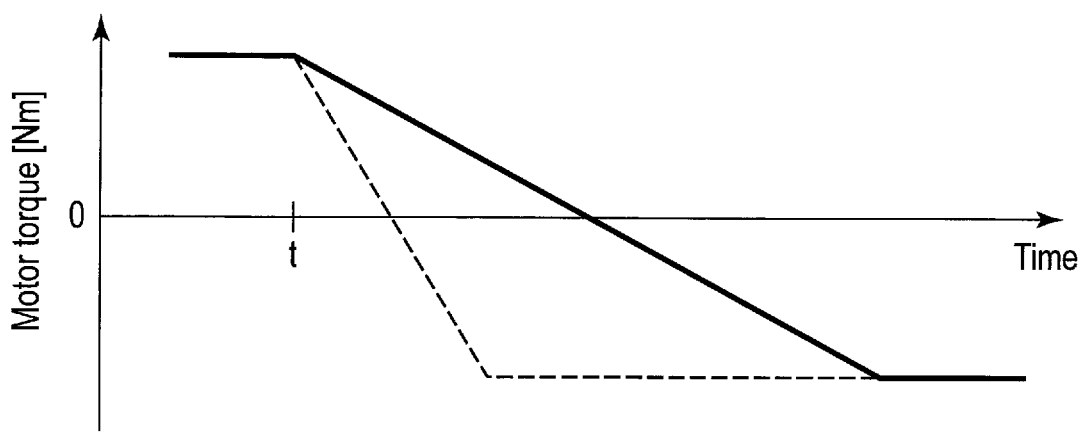
F I G. 4A
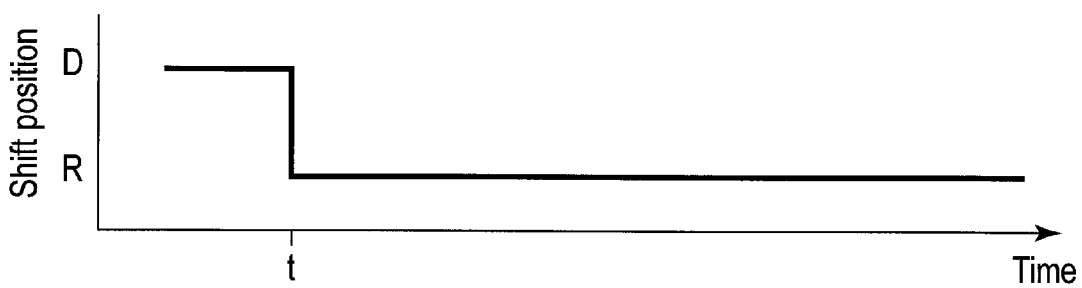
F I G. 4B
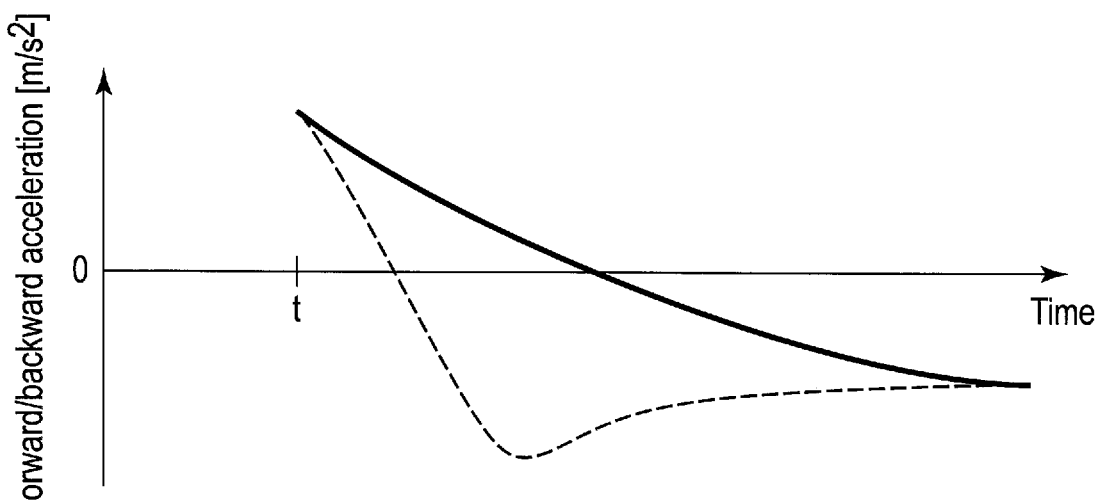
F I G. 4C

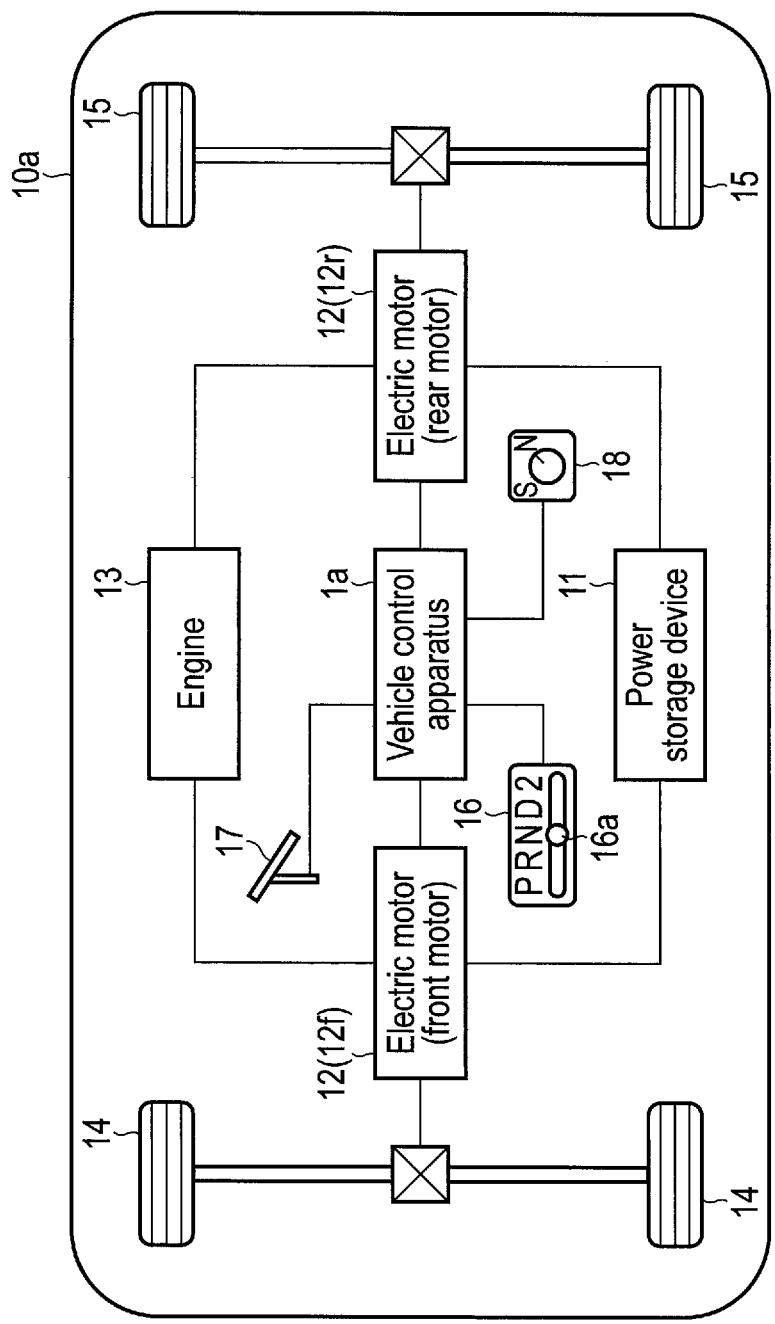
F I G. 6

VEHICLE CONTROL APPARATUS

CROSS-REFERENCE TO RELATED APPLICATIONS

This application is based upon and claims the benefit of priority from prior Japanese Patent Applications No. 2018-103822, filed May 30, 2018; and No. 2019-051609, filed Mar. 19, 2019, the entire contents of all of which are incorporated herein by reference.

BACKGROUND OF THE INVENTION

1. Field of the Invention

The present invention relates to a vehicle control apparatus configured to suppress fluctuations of a vehicle at the time of acceleration from a low-speed state.

2. Description of the Related Art

Heretofore, various vehicles (electrically driven vehicles) such as an electric vehicle (EV) and plug-in hybrid electric vehicle capable of traveling by means of an electric motor supplied with electric power from a power storage device are known.

In such a vehicle, for example, when the vehicle is decelerated to such a degree that gear shifting from drive to reverse or from reverse to drive is enabled, if the drive torque of the electric motor is high, there is a possibility of the vehicle fluctuating at the time of acceleration after such gear shifting. At this time, forward acceleration or backward acceleration abruptly changes, whereby the passenger (vehicle) is shaken in the front-back direction.

For example, there is a vehicle capable of traveling in a plurality of traveling modes according to the traveling scene or by selection of the driver. In the plurality of traveling modes, even when the amount of depression of the accelerator pedal (throttle position) is constant, the immediately subsequent rate of increase in the drive torque of the electric motor differs depending on the traveling mode in some cases. Accordingly, in a traveling mode in which the rate of increase in the drive torque at the time of acceleration from a low-speed state is large, fluctuations of the vehicle conspicuously occur depending on the degree of the rate of increase in the drive torque.

Thus, a vehicle control apparatus capable of preventing a vehicle from fluctuating at the time of acceleration from a low-speed state such as a state or the like after gear shifting from drive/reverse to reverse/drive, for example, at the time of putting the vehicle into or out of a garage or at the time of a K-turn is provided.

BRIEF SUMMARY OF THE INVENTION

A vehicle control apparatus according to an embodiment of the present invention comprises a detection section, a control section. The detection section is configured to detect vehicle information including a vehicle speed of a vehicle driven by an electric motor and drive torque of the electric motor.

The control section is configured to moderate a rate of increase in the drive torque at the time of acceleration with respect to a rate of increase set in advance on the basis of a detection result of the detection section on condition that the vehicle speed of the vehicle is less than or equal to a predetermined speed and the drive torque is greater than or equal to a predetermined threshold.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic view of a vehicle in which a vehicle control apparatus according to a first embodiment of the present invention is incorporated.

FIG. 3 is a view showing a control flow of the vehicle control apparatus according to the first embodiment of the present invention.

FIG. 4A is a view showing a state of moderation in the drive torque of an electric motor to be carried out by the vehicle control apparatus according to the first embodiment of the present invention with respect to a case where the shift position is switched from drive (range D) to reverse (range R).

FIG. 4B is a view showing the time transition of the shift position with respect to the state of moderation in the drive torque of the motor shown in FIG. 4A.

FIG. 4C is a view showing the state of fluctuation (forward-and-backward acceleration) of the vehicle with respect to the state of moderation in the drive torque of the motor shown in FIG. 4A.

FIG. 6 is a schematic view of a vehicle in which a vehicle control apparatus according to a second embodiment of the present invention is incorporated.

DETAILED DESCRIPTION OF THE INVENTION

Figure 2:
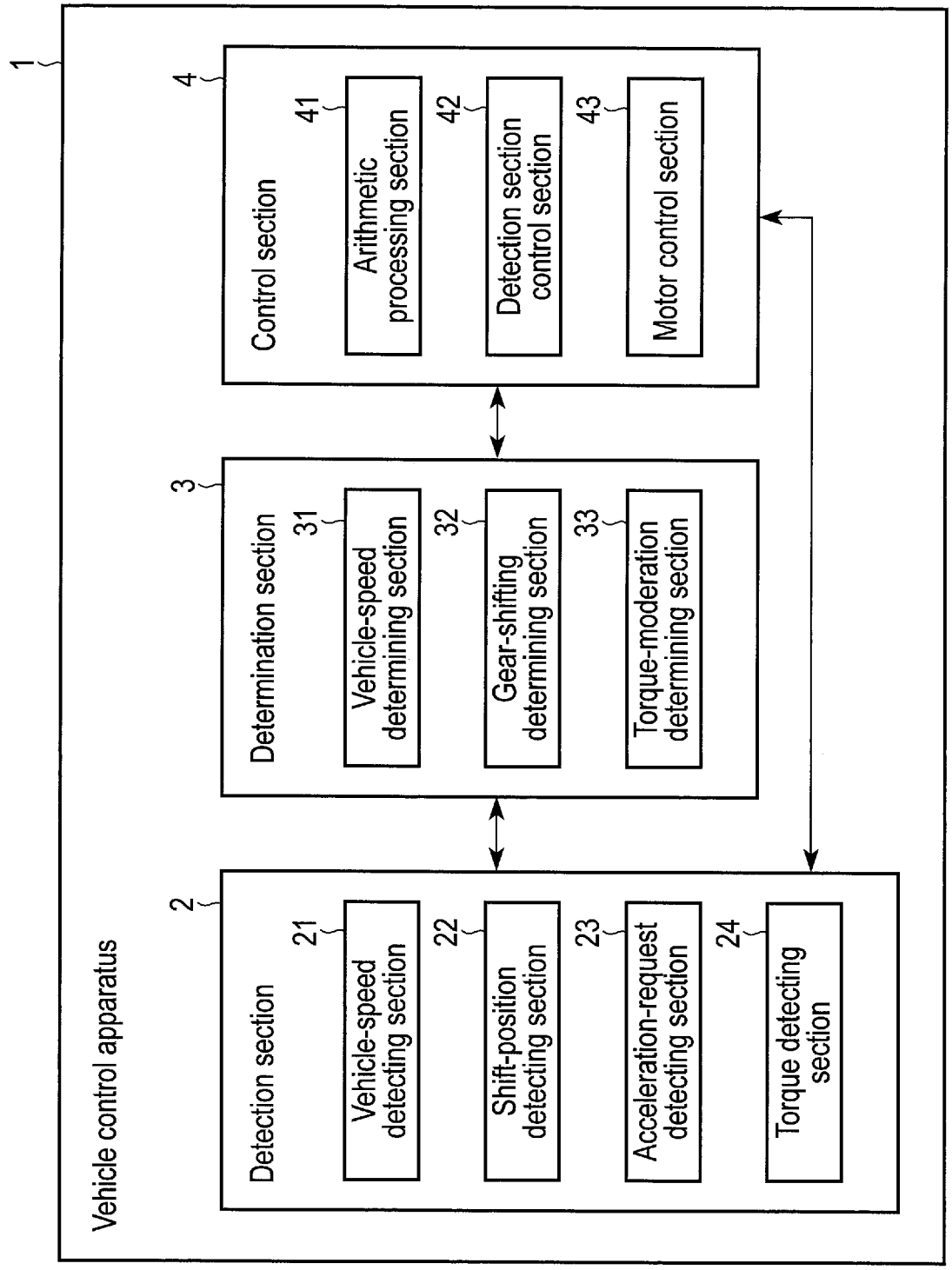
FIG. 2 is a block diagram showing the outline configuration of the vehicle control apparatus according to the first embodiment of the present invention.

Various embodiments will be described hereinafter with reference to the accompanying drawings. In general, according to one embodiment, a vehicle control apparatus according to an embodiment of the present invention comprises a detection section, a control section. The detection section is configured to detect vehicle information including a vehicle speed of a vehicle driven by an electric motor and drive torque of the electric motor. The control section is configured to moderate a rate of increase in the drive torque at the time of acceleration with respect to a rate of increase set in advance on the basis of a detection result of the detection section on condition that the vehicle speed of the vehicle is less than or equal to a predetermined speed and the drive torque is greater than or equal to a predetermined threshold.

Hereinafter, a vehicle control apparatus according to each of the embodiments of the present invention will be described with reference to FIGS. 1 through 8. The vehicle control apparatus of each of the embodiments is an apparatus configured to suppress fluctuations (shock) of a vehicle as the need arises at the time of acceleration from a low speed. The low speed implies a state where the vehicle speed is less than or equal to a predetermined speed and is, for example, a state where the vehicle is decelerated to such a degree that gear shifting from drive to reverse or from reverse to drive is enabled. The fluctuation of the vehicle is a swing occurring due to an abrupt change in the forward acceleration or backward acceleration when the acceleration torque (drive torque of the electric motor to be described later) is excessively great relatively to the vehicle speed at the time of acceleration from the low-speed state described above. It should be noted that in the following description, the process in which a shift operation is carried out from drive to reverse or from reverse to drive is defined as gear shifting.

FIG. 1 is a schematic view of a vehicle 10 in which a vehicle control apparatus 1 according to this embodiment is incorporated. The vehicle 10 is an electrically driven vehicle capable of traveling by means of a driving mechanism (electric motor) 12 supplied with electric power from a power storage device (battery pack) 11 and is, for example, an electric vehicle (EV), plug-in hybrid electric vehicle or the like. In FIG. 1, the configuration of a PHEV incorporating therein an engine 13 in addition to the electric motor 12 is shown as an example. As long as a vehicle is such an electrically driven vehicle, the vehicle may be either a private passenger car or a business vehicle such as a truck, bus, and the like, and the intended end-use or type of vehicle does not particularly matter. In this embodiment, the electric motor 12 includes a front-wheel drive motor (front motor) 12f and rear-wheel drive motor (rear motor) 12r respectively configured to drive front wheels 14 and rear wheels 15. However, a drive mechanism of the vehicle may be constituted of one electric motor by unifying the front motor 12f and rear motor 12r into one motor.

First Embodiment

FIG. 2 is a block diagram of a vehicle control apparatus 1 according to a first embodiment. As shown in FIG. 2, the vehicle control apparatus 1 is provided with a detection section 2, determination section 3, and control section 4. The detection section 2 is connected to the determination section 3 and control section 4 by wire or wireless, and the operation thereof is controlled by the control section 4. The detection section 2 operation-controlled by the control section 4 carries out detection of various types of vehicle information and supplies detection results to the determination section 3 and control section 4.

The detection section 2 is configured to carry out various types of detection necessary for suppression of fluctuations of the vehicle and hence is constituted of a vehicle-speed detecting section 21, shift-position detecting section 22, acceleration-request detecting section 23, and torque detecting section 24.

The vehicle-speed detecting section 21 includes various sensors such as a vehicle-speed sensor configured to sense a vehicle speed of a vehicle, brake sensor configured to sense depression of the brake pedal, and the like. By means of these sensors, the vehicle-speed detecting section 21 detects the vehicle speed of the vehicle.

The shift-position detecting section 22 includes a shift-position sensor or gear-position sensor configured to sense a position (shift position) of a shift lever 16a (see FIG. 1) of an automatic transmission 16. By means of the sensor, the shift-position detecting section 22 detects the timing for switching (i.e., gear shifting) between drive (range D) and reverse (range R) of the vehicle.

The acceleration-request detecting section 23 detects a request for acceleration to the vehicle. The acceleration-request detecting section 23 is, for example, an accelerator-pedal (gas-pedal) sensor configured to sense the depression amount (throttle position) of the accelerator pedal (gas pedal) 17 (see FIG. 1) of the vehicle. Thereby, the acceleration-request detecting section 23 detects each of presence/absence of a request for acceleration to the vehicle and the magnitude (requested torque) thereof.

The torque detecting section 24 is a motor-torque sensor configured to sense the drive torque of the electric motor. The torque detecting section 24 detects each of the magnitude of the drive torque of the electric motor and direction (forward drive torque or backward drive torque) thereof. In this embodiment, as the electric motor, a front motor and rear motor are provided, and the torque detecting section 24 detects the drive torque of each of the front motor and rear motor.

The determination section 3 is operation-controlled by the control section 4, determines various determination conditions on the basis of the detection results of the detection section 2, and supplies the determination results to the control section 4. In this embodiment, the determination section 3 is configured to determine determination conditions necessary for suppression of fluctuations of the vehicle and hence is constituted of a vehicle-speed determining section 31, gear-shifting determining section 32, and torque-moderation determining section 33. The vehicle-speed determining section 31, gear-shifting determining section 32, and torque-moderation determining section 33 are stored, as, for example, programs in a storage device (non-volatile memory) of an arithmetic processing section 41 to be described later. It should be noted that the determination section 3 may also be configured in such a manner that these programs are stored in a part on the cloud and the arithmetic processing section 41 is made to appropriately communicate with the cloud so that a desired program can be utilized. In this case, the arithmetic processing section 41 is configured in such a manner as to include a module for communication with the cloud, antenna, and the like.

The vehicle-speed determining section 31 determines a vehicle speed condition on the basis of the vehicle speed detected by the vehicle-speed detecting section 21. The vehicle speed condition is a condition for determining whether or not the vehicle is in the low-speed state and is, in this embodiment, a condition indicating whether or not the vehicle is decelerated to a predetermined speed (hereinafter referred to as a reference speed) at which gear shifting from drive to reverse or from reverse to drive is enabled. The reference speed is, for example, about 10 km/hour. In determining the vehicle speed condition, the vehicle-speed determining section 31 compares the vehicle speed detected by the vehicle-speed detecting section 21 with the reference speed. When the vehicle speed condition is satisfied, the vehicle-speed determining section 31 determines that the vehicle is in the low-speed state and, when the vehicle speed condition is not satisfied, determines that the vehicle is not in the low-speed state.

The gear-shifting determining section 32 determines whether or not gear shifting has been carried out and shift position after gear shifting on the basis of the shift position detected by the shift-position detecting section 22. In this case, the gear-shifting determining section 32 determines whether or not the position of the shift lever 16a (see FIG. 1) is changed from drive (range D) to reverse (range R) or from reverse (range R) to drive (range D) (hereinafter referred to as a shift condition) before and after the determination. For example, when the detection value of the shift position differs between the last determination and determination of this time, the gear-shifting determining section 32 determines that the shift condition has been satisfied, i.e., that gear shifting has been carried out. On the other hand, when the detection value of the shift position does not differ between the last determination and determination of this time, the gear-shifting determining section 32 determines that the shift condition has not been satisfied, i.e., that gear shifting has not been carried out.

The torque-moderation determining section 33 determines whether or not moderation in the rate of increase in the drive torque (increasing rate) is necessary (hereinafter referred to as a moderation condition). In this embodiment, the torque-moderation determining section 33 determines the moderation condition for each of the front motor and rear motor. In this case, the torque-moderation determining section 33 compares the detection value of the drive torque with a predetermined threshold (hereinafter referred to as a moderation reference value).

In this embodiment, as one example, the forward drive torque and moderation reference value thereof (hereinafter referred to as a forward moderation reference value) are regarded as positive values, and backward drive torque and moderation reference value thereof (hereinafter referred to as a backward moderation reference value) are regarded as negative values, whereby the values for advancing and values for backing are discriminated from each other for the sake of convenience. Accordingly, when the detection value is the forward drive torque, if the value is greater than or equal to the forward moderation reference value and, when the detection value is the backward drive torque, if the value is less than or equal to the backward moderation reference value, the torque-moderation determining section 33 determines that the moderation condition is satisfied. That is, the torque-moderation determining section 33 determines that moderation in the rate of increase is necessary for the rate of increase in the drive torque set in advance. On the other hand, when the detection value is the forward drive torque, if the value is less than the forward moderation reference value and, when the detection value is the backward drive torque, if the value is greater than the backward moderation reference value, the torque-moderation determining section 33 determines that the moderation condition is not satisfied. That is, the torque-moderation determining section 33 determines that moderation in the rate of increase is not necessary for the rate of increase in the drive torque set in advance. However, when the determination is carried with respect only to the magnitude of the backward drive torque without regard to the direction of the backward drive torque, the moderation condition of the backward drive torque can also be determined in the same manner as the forward drive torque. That is, regardless of whether the value is a value for advancing or value for backing, if the drive torque (absolute value) is greater than or equal to the moderation reference value, it is determined that the moderation condition is satisfied and, if the drive torque falls short of the moderation reference value, it is determined that the moderation condition is not satisfied. It should be noted that the rate of increase in the drive torque is moderated with respect to the rate of increase set in advance, whereby the drive torque itself is moderated as a result, and hence hereinafter such a moderated state is referred to as moderation in the drive torque. Further, the rate of increase in the drive torque set in advance implies the value of the rate of increase in the drive torque at the current point in time before drive torque moderation. The rate of increase in the drive torque set in advance is, for example, the value of the rate of increase in the drive torque in the normal times corresponding to the acceleration request (depression amount of the accelerator pedal 17), value to be automatically set according to the acceleration request corresponding to the traveling mode of the vehicle to be described later, value to be arbitrarily set by the driver or the like, and the method of setting the value does not matter.

The moderation reference value is, for example, a value of a map (hereinafter referred to as a reference map) indicative of a relationship between the acceleration request (depression amount of the accelerator pedal 17) and drive torque, and is a value of the drive torque having a possibility of fluctuating the vehicle at the time of acceleration from the low-speed state unless the drive torque is moderated. The acceleration request is detected by the acceleration-request detecting section 23. The moderation reference value includes the forward moderation reference value corresponding to the forward drive torque and backward moderation reference value corresponding to the backward drive torque as described above. The absolute values of the forward moderation reference value and backward moderation reference value for the same acceleration request (depression amount of the accelerator pedal 17) may be identical to each other or may be different from each other. The reference map on which these moderation reference values are set is stored in the storage device of the control section 4 (arithmetic processing section 41) to be described later and is read by the torque-moderation determining section 33 at the time of determination of the moderation condition.

The control section 4 is configured as, for example, a vehicle Electronic Control Unit (ECU) and carries out fluctuation suppression control of the vehicle as one of control items to be executed by the vehicle ECU. However, the control section 4 may also be configured independently of the vehicle ECU.

The control section 4 is provided with an arithmetic processing section 41 including a CPU, memory, storage device (nonvolatile memory), input/output circuit, timer, and the like. The arithmetic processing section 41 reads various data items by means of the input/output circuit, subjects the data items to arithmetic processing by means of the CPU by using a program read from the storage device into the memory, and carries out fluctuation suppression control of the vehicle on the basis of the processing result.

Further, the control section 4 is configured to carry out various control items necessary for fluctuation suppression of the vehicle and hence is constituted of a detection section control section 42 and motor control section 43. The detection section control section 42 and motor control section 43 are stored in the storage device (nonvolatile memory) of the arithmetic processing section 41 as, for example, programs. It should be noted that, as in the case of the determination section 3, the control section 4 may also be configured in such a manner that these programs are stored in a part on the cloud and the arithmetic processing section 41 is made to appropriately communicate with the cloud so that a desired program can be utilized.

The detection section control section 42 controls the operation of the detection section 2 (vehicle-speed detecting section 21, shift-position detecting section 22, acceleration-request detecting section 23, and torque detecting section 24). In this embodiment, by being controlled by the detection section control section 42, the vehicle-speed detecting section 21 detects the vehicle speed, shift-position detecting section 22 detects whether or not gear shifting has been carried out and shift position, acceleration-request detecting section 23 detects presence/absence of an acceleration request and requested torque, and torque detecting section 24 detects the drive torque of the electric motor, and these sections 21 to 24 supplies the detection results (acquired data items) to the detection section control section 42. The detection section control section 42 appropriately delivers the supplied data items to the determination section 3 (vehicle-speed determining section 31, gear-shifting determining section 32, and torque-moderation determining section 33) and motor control section 43 through the arithmetic processing section 41.

The motor control section 43 controls the drive torque of the electric motors on the basis of the determination results of the determination section 3. In this embodiment, the motor control section 43 carries out control to moderate the drive torque at the time of acceleration from the low-speed state. At this time, the motor control section 43 lowers the output of the electric motor in such a manner as to moderate, for example, the drive torque in the traveling direction of the vehicle. Regarding the degree of moderation, it is sufficient if the motor control section 43 appropriately sets the degree of moderation from the acceleration request (depression amount of the accelerator pedal 17) and drive torque on the basis of the reference map. Alternatively, it is also sufficient if a plurality of reference maps corresponding to a plurality of traveling modes that can be set to the vehicle are prepared, map to be referred to is appropriately switched, and degree of moderation is set on the basis of the switched (selected) reference map. Moderation in the drive torque based on map switching described above will be described in detail in the second embodiment to be described later.

The vehicle control apparatus 1 configured as described above carries out moderation control of the drive torque of the electric motor in the following manner in order to suppress fluctuations of the vehicle at the time of acceleration from the low-speed state. In FIG. 3, a control flow at the time of moderation control of the drive torque to be carried out by the vehicle control apparatus 1 in this embodiment is shown. Hereinafter, the control to be carried out by the vehicle control apparatus 1 and function thereof will be described in accordance with the flow shown in FIG. 3.

It should be noted that such control to be carried out by the vehicle control apparatus 1 is brought to a state where the control can be executed when a state where the vehicle can travel, e.g., a state where the ignition switch or power switch is turned on is obtained. Then, when a state where the vehicle cannot travel, e.g., a state where ignition switch or power switch is turned off (locked state) is brought about, the state where such control can be executed is terminated.

As shown in FIG. 3, when the vehicle control apparatus 1 is to carry out moderation control of the drive torque, the detection section 2 carries out detection of vehicle information (S101). In this embodiment, the operation is controlled by the detection section control section 42, vehicle-speed detecting section 21 detects the vehicle speed, shift-position detecting section 22 detects whether or not gear shifting has been carried out and shift position, acceleration-request detecting section 23 detects presence/absence of an acceleration request and requested torque, and torque detecting section 24 detects the drive torque of the electric motor.

Subsequently, the determination section 3 makes the determination whether or not the moderation control of the drive torque should be executed in the following manner on the basis of the vehicle information detected by the detection section 2.

The vehicle-speed determining section 31 determines whether or not the vehicle is in the low-speed state (vehicle speed condition) on the basis of the vehicle speed detected by the vehicle-speed detecting section 21 (S102). In this case, when the vehicle speed is less than or equal to the reference speed, the vehicle-speed determining section 31 determines that the vehicle speed condition is satisfied and, when the vehicle speed exceeds the reference speed, determines that the vehicle speed condition is not satisfied.

When it is determined in S102 that the vehicle speed condition is satisfied, the gear-shifting determining section 32 determines whether or not gear shifting has been carried out (shift condition) on the basis of the shift position detected by the shift-position detecting section 22 (S103).

When it is determined in S103 that the shift condition is satisfied, the gear-shifting determining section 32 subsequently determines the shift position after the gear shifting (S104).

When the shift position is drive (range D) in S104, the torque-moderation determining section 33 determines whether or not moderation in the drive torque is necessary (moderation condition) on the basis of the drive torque (forward drive torque) detected by the torque detecting section 24 (S105). In this case, when the forward drive torque is greater than or equal to the forward moderation reference value, the torque-moderation determining section 33 determines that the moderation condition is satisfied and, when the forward drive torque falls short of the forward moderation reference value, determines that the moderation condition is not satisfied.

In S105, when it is determined that the moderation condition is satisfied, the motor control section 43 moderates the forward drive torque (S106). For example, the motor control section 43 lowers the forward drive torque to a value lower than the value of the drive torque corresponding to the acceleration request (depression amount of the accelerator pedal 17) on the reference map. At this time, the motor control section 43 moderates the rate of increase in the forward drive torque (increasing rate) to thereby moderate the forward drive torque itself. Thereby, the forward drive torque corresponding to the depression amount of the accelerator pedal 17 becomes lower. That is, the rate of increase in the forward drive torque is moderated with respect to the rate of increase set in advance.

On the other hand, when the shift position is reverse (range R) in S104, the torque-moderation determining section 33 determines whether or not moderation in the drive torque is necessary (moderation condition) on the basis of the drive torque (backward drive torque) detected by the torque detecting section (S107). In this case, when the backward drive torque (negative value) is less than or equal to the backward moderation reference value, the torque-moderation determining section 33 determines that the moderation condition is satisfied and, when the backward drive torque exceeds the backward moderation reference value, determines that the moderation condition is not satisfied. Here, in order to discriminate the backward drive torque from the forward drive torque (positive value), the backward drive torque is made the negative value for the sake of convenience, and hence the moderation condition is determined in the manner described above.

In S107, when it is determined that the moderation condition is satisfied, the motor control section 43 moderates the backward drive torque (S108). For example, the motor control section 43 lowers the backward drive torque to a value lower than the value of the drive torque corresponding to the acceleration request (depression amount of the accelerator pedal 17) on the reference map. At this time, the motor control section 43 moderates the rate of increase in the backward drive torque (increasing rate) to thereby moderate the backward drive torque itself. Thereby, the backward drive torque corresponding to the depression amount of the accelerator pedal 17 becomes lower. That is, the rate of increase in the backward drive torque is moderated with respect to the rate of increase set in advance.

It should be noted that when it is determined in S102 that the vehicle speed condition is not satisfied, when it is determined in S103 that the shift condition is not satisfied, or when it is determined in S105 and S107 that the moderation condition is not satisfied, the motor control section 43 does not carry out moderation control of the drive torque. Accordingly, the vehicle continues traveling while accelerating the vehicle speed at the rate of increase (increasing rate) in the drive torque set in advance without the drive torque being moderated. When the vehicle speed condition is not satisfied, the vehicle is not in the low-speed state, when the shift condition is not satisfied, gear shifting has not been carried out, and when the moderation condition is not satisfied, the drive torque is less than the moderation reference value, and hence in any case fluctuations of the vehicle are suppressed.

Further, while the vehicle continues traveling, the vehicle control apparatus 1 repeats the predetermined control until, for example, the ignition switch or power switch is brought to the off-state in preparation for the next moderation control of the drive torque (S109). That is, the detection section 2 continues detecting the vehicle information, determination section 3 determines whether or not execution of moderation control of the drive torque is necessary on the basis of the vehicle information newly detected by the detection section 2, and control section 4 repeats the moderation control on the basis of a result of the aforementioned determination. Thereby, it is possible to make the vehicle continue traveling while suppressing fluctuations of the vehicle at time of acceleration from the low-speed state.

Figure 5A:
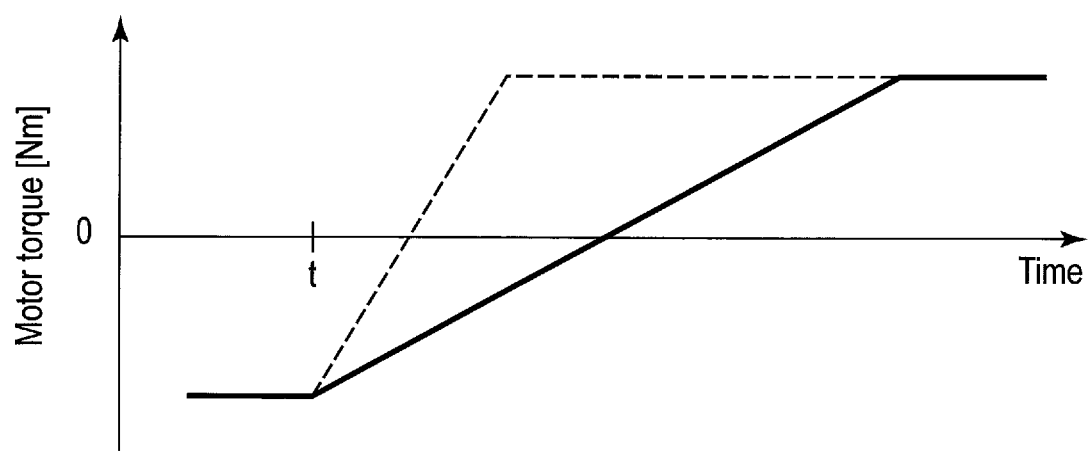
FIG. 5A is a view showing a state of moderation in the drive torque of the electric motor to be carried out by the vehicle control apparatus according to the first embodiment of the present invention with respect to a case where the shift position is switched from reverse (range R) to drive (range D).
Figure 5B:
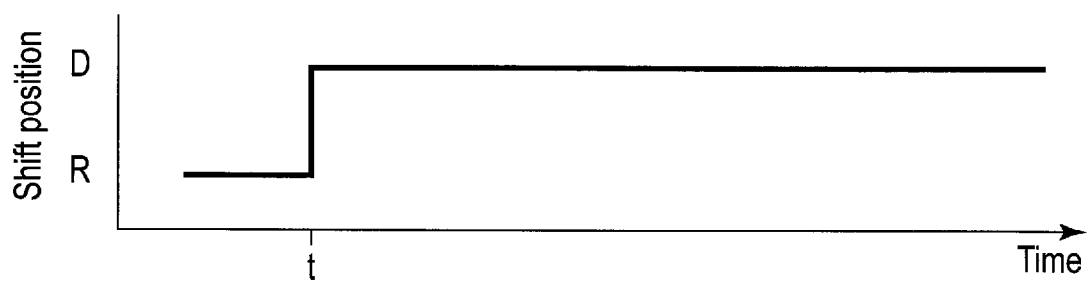
FIG. 5B is a view showing the time transition of the shift position with respect to the state of moderation in the drive torque of the motor shown in FIG. 5A.
Figure 5C:
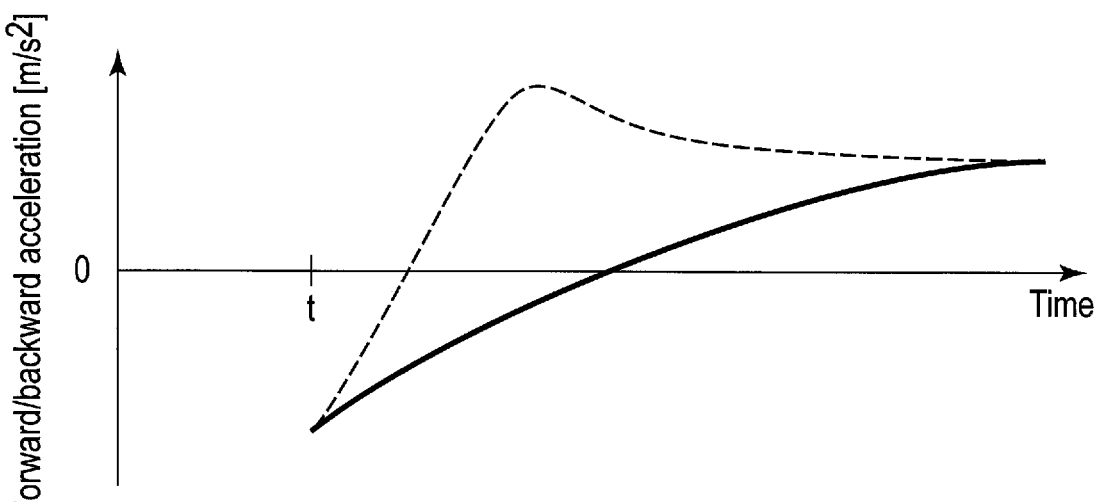
FIG. 5C is a view showing the state of fluctuation (forward-and-backward acceleration) of the vehicle with respect to the state of moderation in the drive torque of the motor shown in FIG. 5A.

For example, in FIG. 4A, an example of a state where the drive torque of the electric motor is moderated when the shift position is switched from drive (range D) to reverse (range R) is shown. Further, in FIG. 5A, an example of a state where the drive torque of the electric motor is moderated when the shift position is switched from reverse (range R) to drive (range D) is shown. In each of FIG. 4A and FIG. 5A, the solid line indicates the time transition of the drive torque according to this embodiment. In contrast to this, the broken line indicates the time transition of the drive torque of the case where moderation control has not been carried out in the traveling situation equivalent to the case of the solid line (comparative example), i.e., the case where traveling is continued at the rate of increase in the drive torque set in advance. Further, in each of FIG. 4B and FIG. 5B, an example of the time transition of the shift position which is the moderated state of the drive torque shown in each of FIG. 4A and FIG. 5A is shown. In each of FIG. 4C and FIG. 5C, an example of the fluctuated state (time variation in the forward/backward acceleration) concomitant with moderation in the drive torque. In each of FIG. 4C and FIG. 5C, the solid line indicates the time variation in the forward/backward acceleration of the case where the moderation control of the drive torque according to this embodiment has been carried out. In contrast to this, the broken line indicates the time variation in the forward/backward acceleration of the case where the moderation control has not been carried out in the traveling situation equivalent to the case of the solid line (comparative example), i.e., the case where traveling is continued at the rate of increase in the drive torque set in advance. It should be noted that in each of FIG. 4A and FIG. 5A, the axis of ordinate indicates the forward drive torque as a positive value, and indicates the backward drive torque as a negative value. In each of FIG. 4C and FIG. 5C, the axis of ordinate indicates the forward acceleration as a positive value, and indicates the backward acceleration as a negative value. In each of FIGS. 4A through 4C and FIGS. 5A through 5C, the axis of abscissa indicates time.

As shown in FIG. 4A and FIG. 5A, in this embodiment, regarding the drive torque of the electric motor (front motor and rear motor), the rate of increase at the time of acceleration after gear shifting (elapsed time shown in each of FIG. 4B and FIG. 5B after t) has lowered as compared with the comparative example (broken line) in which moderation control has not been carried out. As a result, as shown in each of FIG. 4C and FIG. 5C, in the time variation in the forward/backward acceleration (solid line) of this embodiment, abrupt changes (peaks and troughs) are suppressed and the locus becomes gentler as compared with the comparative example (broken line). That is, fluctuations of the vehicle in this embodiment becomes less at the time of acceleration after gear shifting as compared with the comparative example (broken line) in which moderation control of the drive torque is not carried out.

As described above, according to the vehicle control apparatus 1 of this embodiment, the drive torque is moderated, whereby it is possible to lower the drive torque to a value appropriate for the acceleration request (depression amount of the accelerator pedal 17), and suppress fluctuations of the vehicle at the time of acceleration from the low-speed state. For example, it is possible to suppress fluctuations of the vehicle when the vehicle is to be accelerated after gear shifting at the time of, for example, putting the vehicle into or out of a garage or at the time of a K-turn. Accordingly, it is possible to improve the driving environment such as reduction in the driving burden of the driver, and improve the safety.

In this embodiment, from the acceleration request and value of the drive torque, and on the basis of the reference map, each time the degree of moderation in the drive torque is set. However, the degree of moderation in the drive torque may be set by simply switching the reference maps. Hereinafter, an embodiment in which the degree of moderation in the drive torque is set by switching the reference maps as described above will be described as a second embodiment.

Second Embodiment

Figure 7:
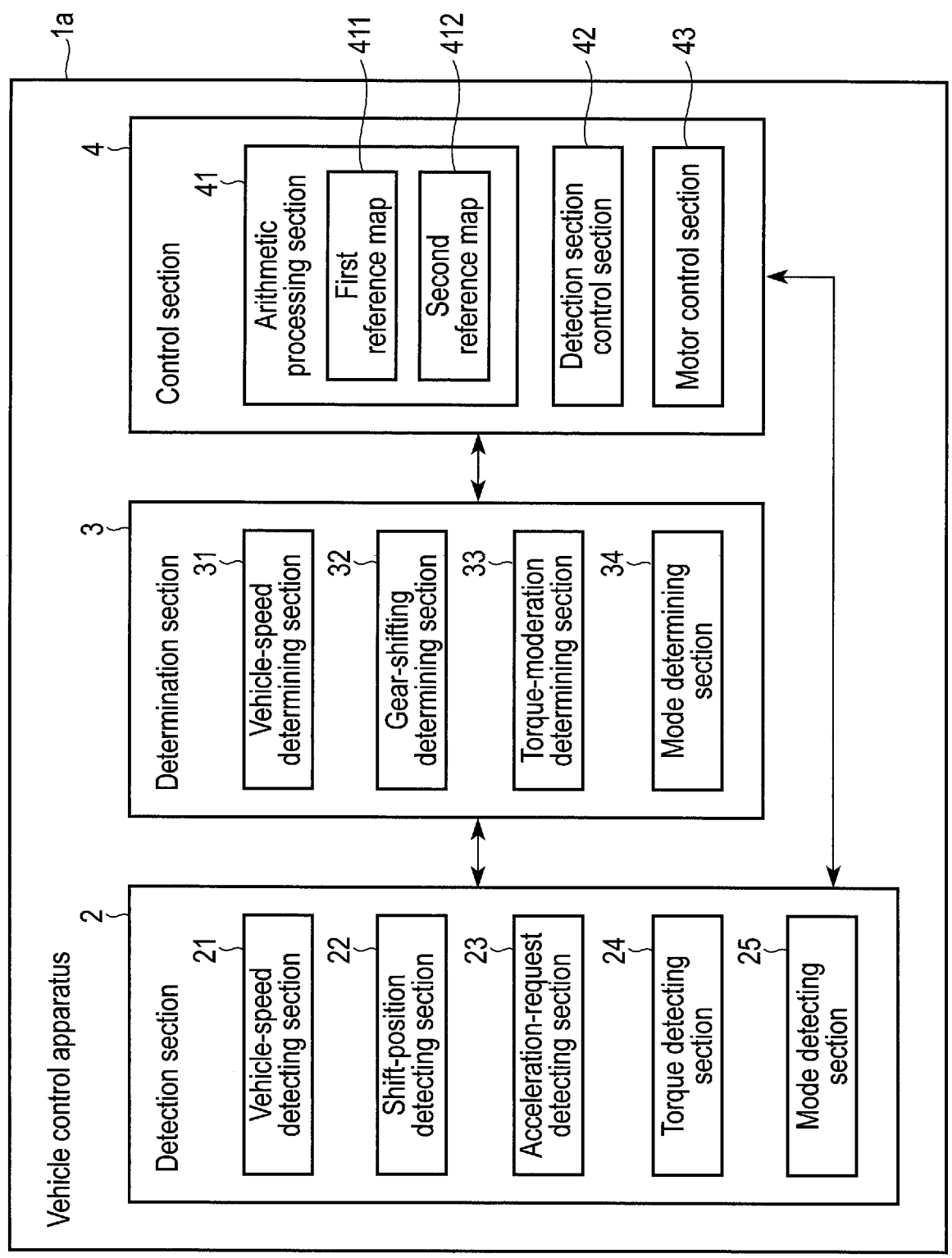
FIG. 7 is a block diagram showing the outline configuration of the vehicle control apparatus according to the second embodiment of the present invention.

FIG. 6 is a schematic view of a vehicle 10a in which a vehicle control apparatus 1a according to a second embodiment is incorporated. The vehicle 10a is identical to the vehicle 10 except for the fact that the vehicle 10a is provided with an operation section 18 configured to set the traveling mode to be described later. FIG. 7 is a block diagram of the vehicle control apparatus 1a according to this embodiment. As shown in FIG. 7, the vehicle control apparatus 1a of this embodiment is provided with a mode detecting section 25 and mode determining section 34 in addition to the sections with which the vehicle control apparatus 1 (FIG. 2) of the first embodiment is provided, and arithmetic processing section 41 includes two reference maps 411 and 412. The fundamental configurations of the vehicle control apparatus 1a other than the above are identical to the vehicle control apparatus 1. Accordingly, the fundamental configurations identical to the vehicle control apparatus 1 are denoted by reference symbols identical to the vehicle control apparatus 1 on the drawings and their descriptions are omitted.

The mode detecting section 25 is included in the detection section 2 as one of the sections thereof and is configured to detect the traveling mode of the vehicle. The mode detecting section 25 is a sensor configured to sense an operation (on/off, switching), set values or the like of the operation section 18 (see FIG. 6), such as a button and switch provided in the vehicle for the purpose of setting the traveling mode.

The traveling mode of the vehicle is a traveling state to be set when the vehicle control apparatus 1a carries out a drive assist of the vehicle, and examples thereof are a normal mode, sport mode, eco-mode, and the like. For example, the normal mode is a mode in which the vehicle travels in accordance with the legal speed, traffic flow, and the like. The sport mode is a mode in which the target value of the speed or acceleration is higher than the normal mode, and importance is attached to traveling performance in such a manner that even when the depression amount of the accelerator pedal 17 is identical to the normal mode, the target speed is reached earlier than the normal mode. The eco-mode is a mode attaching greater importance to fuel economy than the normal mode. It should be noted that these modes are only exemplifications of the traveling mode, and various traveling modes corresponding to various conditions such as type of vehicle, travel road, driver, and the like are conceivable.

To each of the traveling modes, a map (reference map) indicating a correspondence relationship between an acceleration request (depression amount of the accelerator pedal 17) and drive torque corresponding to the traveling mode is linked. In this embodiment, as one example, reference maps corresponding to two traveling modes are prepared. According to a relationship between an acceleration request and drive torque based on a reference map (hereinafter referred to as a first reference map 411) corresponding to the first traveling mode, fluctuations of the vehicle are suppressed at the time of acceleration from the low-speed state. In contrast to this, according to a relationship between an acceleration request and drive torque based on a reference map (hereinafter referred to as a second reference map 412) corresponding to the second traveling mode, there is a possibility of the vehicle being fluctuated at the time of acceleration from the low-speed state. For example, it is possible to make the first traveling mode correspond to the normal mode or eco-mode, and make the second traveling mode correspond to the sport mode. The first reference map 411 and second reference map 412 are stored in a storage device (nonvolatile memory) of an arithmetic processing section 41 and are read by a motor control section 43 at the time of moderation control of the drive torque.

The mode determining section 34 is stored in the storage device (nonvolatile memory) of the arithmetic processing section 41 as one of programs of the determination section 3, and determines which of the first traveling mode and second traveling mode is the current traveling mode on the basis of the traveling mode of the vehicle detected by the mode detecting section 25.

Figure 8:
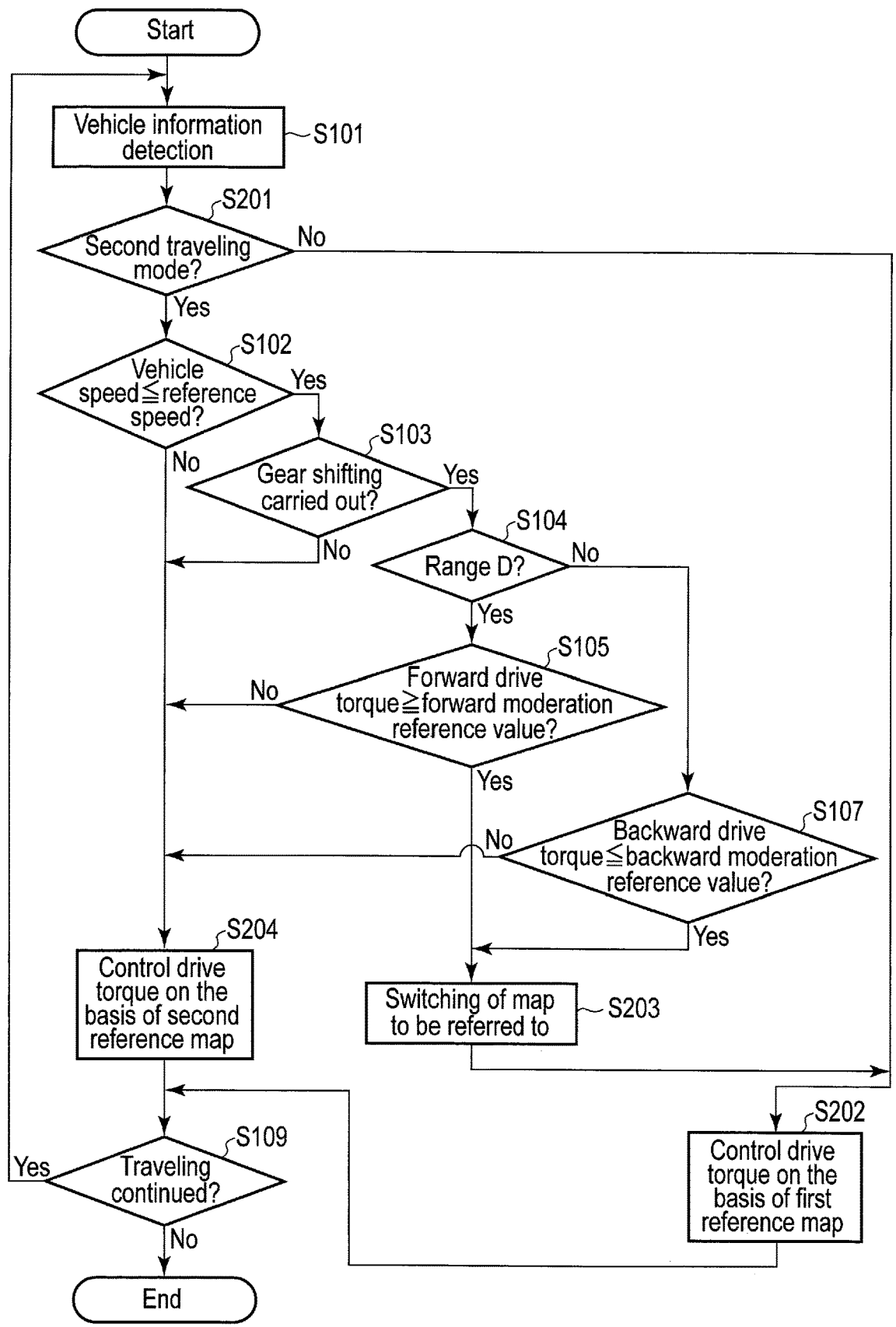
FIG. 8 is a view showing a control flow of the vehicle control apparatus according to the second embodiment of the present invention.

In FIG. 8, a control flow at the time of moderation control of the drive torque to be carried out by the vehicle control apparatus 1a in this embodiment is shown. Hereinafter, the control to be carried out by the vehicle control apparatus 1a and function thereof will be described according to the flow shown in FIG. 8. It should be noted that the control flow of this embodiment is formed by changing part of the control flow (FIG. 3) of the first embodiment and appropriately adding thereto control characteristic of the second embodiment. Accordingly, control identical to or similar to the first embodiment described above is denoted by a step number identical to the first embodiment and a description thereof is omitted and only control characteristic of the second embodiment is described.

In this embodiment, detection of vehicle information in S101 includes detection of the traveling mode to be carried out by the mode detecting section 25. Further, before determining the vehicle speed condition in S102, the mode determining section 34 determines the traveling mode of the vehicle. In this case the mode determining section 34 determines whether the traveling mode at the current point in time (at the time of determination) is the first traveling mode (normal mode as an example) or the second traveling mode (sport mode as an example) (S201).

When the traveling mode is not the second traveling mode in S201, i.e., when the traveling mode is the first traveling mode, the motor control section 43 does not carry out moderation control of the drive torque. In this case, the motor control section 43 makes the vehicle continue traveling at the value of the drive torque corresponding to the acceleration request (depression amount of the accelerator pedal 17) on the first reference map 411 (S202). That is, the vehicle continues traveling while accelerating the speed thereof at the rate of increase (increasing rate) in the drive torque based on the first reference map 411 without the drive torque thereof being moderated. By following the relationship between the acceleration request and drive torque based on the first reference map 411, it is possible to suppress fluctuations of the vehicle even at the time of acceleration from the low-speed state.

When the traveling mode is the second traveling mode in S201, the vehicle-speed determining section 31 determines the vehicle speed condition (S102).

When it is determined in S102 that the vehicle speed condition is satisfied, the subsequent steps, i.e., determination of the shift condition (S103), determination of the shift position (S104), and determination whether or not moderation in the drive torque is necessary (moderation condition) (S105, S107) are appropriately carried out.

When it is determined in S105 or S107 that the moderation condition is satisfied, the motor control section 43 moderates the drive torque. At this time, the motor control section 43 switches the map to be referred to from the second reference map 412 to the first reference map 411 (S203). The motor control section 43 reads, for example, the first reference map 411 from the storage device (nonvolatile memory) of the arithmetic processing section 41 and, at the same time, closes the second reference map 412. Then, the motor control section 43 makes the vehicle travel at the value of the drive torque corresponding to the acceleration request on the first reference map 411 (S202). Thereby, it is possible to more adequately moderate the rate of increase (increasing rate) in the drive torque as compared with the case where the second reference map 412 is referred to, and hence it is possible to moderate the drive torque itself. That is, in this case, the value of the rate of increase in the drive torque corresponding to the acceleration request on the second reference map 412 corresponds to the rate of increase set in advance, and the rate of increase in the drive torque is moderated with respect to this rate of increase. It should be noted that when the shift position is drive (range D), the motor control section 43 moderates the forward drive torque and, when the shift position is reverse (range R), moderates the backward drive torque.

On the other hand, when it determined in S102 that the vehicle speed condition is not satisfied, the motor control section 43 makes the vehicle continue traveling at the value of the drive torque corresponding to the acceleration request (depression amount of the accelerator pedal 17) on the second reference map 412 (S204). That is, the vehicle continues traveling while accelerating the speed thereof at the rate of increase in the drive torque (increasing rate) based on the second reference map 412 without the drive torque thereof being moderated. In this case, the vehicle speed condition is not satisfied and thus the vehicle speed exceeds the reference speed (not in the low-speed state), and hence even when the vehicle speed is accelerated at the rate of increase in the drive torque (increasing rate) based on the second reference map 412, fluctuations of the vehicle are suppressed.

Likewise, when it is determined in S103 that the shift condition is not satisfied or when it is determined in S105 or S107 that the moderation condition is not satisfied, the motor control section 43 makes the vehicle continue traveling at the value of the drive torque corresponding to the acceleration request on the second reference map 412 (S204).

Then, irrespective of presence/absence of execution of moderation control of the drive torque (S202, S204), the vehicle control apparatus 1a repeats the predetermined control while the vehicle continues traveling until, for example, the ignition switch or power switch is brought to the off-state in preparation for the next moderation control of the drive torque (S109). That is, the detection section 2 continues detection of the vehicle information, determination section 3 determines whether or not execution of the moderation control of the drive torque is necessary on the basis of the vehicle information newly detected by the detection section 2, and control section 4 repeats the moderation control on the basis of such a determination result.

While the embodiments (the first embodiment and the second embodiment) have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in each of the first and second embodiments described above, it is assumed that the low-speed state of the vehicle is a state where the vehicle is decelerated to such a degree that gear shifting from drive to reverse or from reverse to drive is enabled, and moderation control of the drive torque of the electric motor is executed when gear shifting has been carried out. In place of the above, moderation control of the drive torque may be executed after determining only the vehicle speed condition and moderation condition of the rate of increase in the drive torque irrespective of presence/absence of execution of gear shifting. In this case, it is sufficient if the determination of the shift condition in S103 shown in each of FIG. 3 and FIG. 8 is omitted and, when the vehicle speed condition is satisfied in S102, determination of the shift position in S104 is carried out.

Further, in the second embodiment, a reference map (master map) indicating a relationship between the acceleration request (depression amount of the accelerator pedal 17) and drive torque, the relationship suppressing fluctuations of the vehicle at the time of acceleration from the low-speed state may be prepared separately from the traveling mode. For example, not only in the second traveling mode but also in the first traveling mode, when all of the vehicle speed condition, shift condition, and moderation condition are satisfied, the reference map to be referred to may be switched from the first reference map 411 to the master map and, when these conditions are not satisfied, the vehicle may be made to continue traveling according to the first reference map 411 without any map being switched. In this case, the first reference map 411 may even be such a map that there is a possibility of the map fluctuating the vehicle at the time of acceleration from the low-speed state when the relationship between the acceleration request and drive torque indicated by the map is followed. For example, the first reference map 411 is made to differ from the second reference map 412 in the degree of moderation in the drive torque. Thereby, it is possible to suppress fluctuations of the vehicle at the time of acceleration from the low-speed state while freely setting various traveling modes corresponding to various conditions.

What is claimed is:

1. A vehicle control apparatus comprising:
   a vehicle information detector configured to detect vehicle information including a vehicle speed of a vehicle driven by an electric motor and drive torque of the electric motor; and
   a controller configured to moderate a rate of increase in the drive torque of the electric motor at the time when the vehicle accelerates with respect to a rate of increase in the drive torque set in advance, when the vehicle speed of the vehicle is less than or equal to a predetermined speed at which gear shifting from drive to reverse of from reverse to drive is enabled and the drive torque detected by the vehicle information detector is greater than or equal to a predetermined threshold,
   wherein the vehicle information detector is constituted of a vehicle-speed sensor configured to detect the vehicle speed, a shift-position sensor configured to detect a shift position, an acceleration-request sensor configured to detect a request for acceleration to the vehicle, and a torque sensor configured to detect the drive torque, and
   the controller moderates the rate of increase in the drive torque for the acceleration request detected by the acceleration-request sensor at the time when the detected vehicle speed is less than or equal to a predetermined speed at which gear shifting from drive to reverse or reverse to drive is enabled, the vehicle accelerates after gear shifting from the drive to the reverse or from the reverse to the drive is carried out, and the detected drive torque is greater than or equal to the predetermined threshold.

2. The vehicle control apparatus of claim 1, wherein the vehicle information detector is further constituted of a mode sensor configured to detect which of a plurality of traveling modes of the vehicle is set to the vehicle, the plurality of traveling modes of the vehicle being settable to the vehicle and differing from each other in the drive torque for the acceleration request, and the controller moderates the rate of increase in the drive torque according to the traveling mode of the vehicle detected by the mode sensor, when the vehicle speed of the vehicle detected by the vehicle-speed sensor is less than or equal to the predetermined speed and, after the gear shifting from drive to reverse or from reverse to drive is carried out, the drive torque detected by the torque sensor is greater than or equal to the predetermined threshold.

3. The vehicle control apparatus of claim 1, wherein the controller includes a map indicating a correspondence relationship between the acceleration request and the drive torque, and refers to the map to thereby moderate the rate of increase in the drive torque.

4. The vehicle control apparatus of claim 3, wherein the controller includes a plurality of maps and, when the vehicle speed of the vehicle detected by the vehicle-speed sensor is less than or equal to the predetermined speed and, after the gear shifting from drive to reverse or from reverse to drive is carried out, the drive torque detected by the torque sensor is greater than or equal to the predetermined threshold, carries out switching between or among the plurality of maps, and refers to a map obtained after the switching to thereby moderate the rate of increase in the drive torque.

5. The vehicle control apparatus of claim 4, wherein the controller includes the maps for the plurality of traveling modes of the vehicle, respectively, the maps being linked to the plurality of traveling modes of the vehicle, respectively, the plurality of traveling modes of the vehicle being settable to the vehicle and differing from each other in the drive torque for the acceleration request.

6. The vehicle control apparatus of claim 2, wherein the controller moderates the rate of increase in the drive torque to a degree set by the controller on the basis of the traveling mode of the vehicle detected by the mode sensor.

\* \* \* \* \*